(12) United States Patent
Yang et al.

(10) Patent No.: US 8,474,836 B2
(45) Date of Patent: Jul. 2, 2013

(54) STROLLER AND HANDLE HEIGHT ADJUSTING MECHANISM THEREOF

(75) Inventors: Hao Yang, Taipei (TW); Dao-Chang Li, Taipei (TW)

(73) Assignee: Wonderland Nurserygoods Hong Kong Company Limited, Central (HK)

( * ) Notice: Subject to any disclaimer, the term of this patent is extended or adjusted under 35 U.S.C. 154(b) by 613 days.

(21) Appl. No.: 12/646,280

(22) Filed: Dec. 23, 2009

(65) Prior Publication Data

US 2010/0176566 A1     Jul. 15, 2010

Related U.S. Application Data

(60) Provisional application No. 61/140,891, filed on Dec. 26, 2008.

(30) Foreign Application Priority Data

Jul. 31, 2009   (CN) .......................... 2009 1 0160937

(51) Int. Cl.
*B62B 5/06*         (2006.01)
(52) U.S. Cl.
USPC ....... 280/47.371; 280/648; 280/647; 280/650
(58) Field of Classification Search
USPC ................. 280/33.993, 47.38, 639, 642, 643, 280/644, 647, 648, 649, 650, 658; 16/429
See application file for complete search history.

(56) References Cited

U.S. PATENT DOCUMENTS

| | | | | |
|---|---|---|---|---|
| 5,056,805 A * | 10/1991 | Wang | ........................ | 280/47.36 |
| 5,478,102 A * | 12/1995 | Haung | .......................... | 280/642 |
| 5,516,142 A * | 5/1996 | Hartan | .......................... | 280/642 |
| 5,519,919 A * | 5/1996 | Lee | ............................. | 16/113.1 |
| 5,603,517 A * | 2/1997 | Lorman | ......................... | 280/5.2 |
| 6,416,076 B1 * | 7/2002 | Hou et al. | ..................... | 280/642 |
| 6,447,001 B1 * | 9/2002 | Hsia | ............................. | 280/642 |
| 6,540,238 B2 * | 4/2003 | Yang | ........................... | 280/32.7 |
| 7,011,335 B2 * | 3/2006 | Kight | ......................... | 280/655.1 |
| 7,584,985 B2 * | 9/2009 | You et al. | ..................... | 280/643 |
| 2011/0121546 A1 * | 5/2011 | Stewart | ......................... | 280/650 |

\* cited by examiner

*Primary Examiner* — John Walters
*Assistant Examiner* — James Triggs
(74) *Attorney, Agent, or Firm* — Frommer Lawrence & Haug LLP; Ronald R. Santucci

(57) ABSTRACT

A handle height adjusting mechanism includes: a coupling member disposed on a handle tube of a stroller; an actuating member disposed movably on the handle tube, and coupled to the coupling member for driving movement thereof; an engaging member connected to the coupling member; and a resilient member coupled to the coupling member for biasing the coupling member to a first position, where the engaging member engages the selected positioning hole to arrest movement of the handle tube relative to the frame tube. The actuating member is operable to move the coupling member to a second position against biasing action of the resilient member, such that the engaging member is removed from the selected positioning hole so as to permit movement of the handle tube relative to the frame tube.

20 Claims, 11 Drawing Sheets

STROLLER AND HANDLE HEIGHT ADJUSTING MECHANISM THEREOF

CROSS-REFERENCE TO RELATED APPLICATIONS

This application claims priority of U.S. Provisional Application Ser. No. 61/140,891, filed on Dec. 26, 2008 and Chinese Application Serial No. 200910160937.4, filed on Jul. 31, 2009.

BACKGROUND OF THE INVENTION

1. Field of the Invention

The invention relates to a handle of a stroller, more particularly to a stroller and a handle height adjusting mechanism thereof.

2. Description of the Related Art

A handle height adjusting mechanism is normally provided in a stroller for a user to adjust the height of a handle tube relative to a frame tube to which the handle tube is coupled.

A conventional handle height adjusting mechanism is disclosed in Chinese Patent Publication No. 1772546A, in which an engaging pin is driven to engage and disengage from an engaging hole by a cam groove. However, this design will cause friction on the adjusting frame within an upper tube of the stroller, laborious effort is required by the user when adjusting the height of the handle tube.

SUMMARY OF THE INVENTION

Therefore, the object of the present invention is to provide a handle height adjusting mechanism that is relatively simple in design, that is relatively easy to operate, and that facilitates control at a distance.

Another object of the present invention is to provide a handle height adjusting mechanism that generates less friction between elements during operation, and that requires less effort to operate.

Yet another object of the present invention is to provide a stroller, whose handle height adjusting mechanism is relatively simple in structure and relatively easy to operate, facilitates control at a distance, and has elements with minimal friction during operation.

According to one aspect of the present invention, there is provided a handle height adjusting mechanism for a stroller. The stroller includes a frame tube that has a plurality of positioning holes, and a handle tube that extends movably relative to the frame tube. The handle height adjusting mechanism includes a coupling member, an actuating member, an engaging member, and a resilient member. The coupling member is adapted to be disposed on the handle tube. The actuating member is adapted to be disposed movably on the handle tube, and is coupled to the coupling member for driving movement of the coupling member. The engaging member is connected to the coupling member. The resilient member is coupled to the coupling member for biasing the coupling member to a first position, where the engaging member is adapted to engage the selected one of the positioning holes so as to arrest movement of the handle tube relative to the frame tube. The actuating member is operable to move the coupling member from the first position to a second position against biasing action of the resilient member, such that the engaging member is adapted to be removed from the selected one of the positioning holes so as to permit movement of the handle tube relative to the frame tube.

Preferably, the coupling member is adapted to be pivoted to the handle tube, and is pivotable between the first and second positions.

Preferably, the resilient member is a torsion spring having two ends that are respectively adapted to be connected to the handle tube and the coupling member.

Preferably, the engaging member is pivoted to the coupling member.

Preferably, the engaging member is formed with a groove defined by two teeth, and the coupling member has a protrusion that is disposed movably in the groove.

Preferably, the actuating member includes a control element adapted to be mounted slidably to the handle tube, and a connecting cable adapted to be disposed within the handle tube and connected between the coupling member and the control element, such that the control element is operable to slide along the handle tube so as to drive the coupling member to move.

Preferably, the engaging member is formed with an elongated guiding hole having a first end proximate to the positioning holes, and a second end distal from the positioning holes. The handle height adjusting mechanism may further includes a pin that extends through the elongated guiding hole, that is adapted to be coupled to the handle tube, and that is biased toward one of the first end and the second end of the elongated guiding hole due to biasing action of the resilient member on the coupling member.

Preferably, the elongated guiding hole is disposed to extend substantially perpendicular to the axial direction.

Preferably, the coupling member is adapted to be connected slidably to the handle tube, and is slidable between the first and second positions.

Preferably, the coupling member is formed with an elongated guiding hole that is disposed to be inclined relative to the axial direction. The handle height adjusting mechanism further includes a pin that extends through the elongated guiding hole, and that is coupled to the engaging member.

Preferably, the resilient member is a compression spring that has two ends adapted to abut respectively against the handle tube and the coupling member.

According to another aspect of the present invention, there is provided a handle for a stroller. The stroller includes a frame tube that has a plurality of positioning holes. The handle includes a handle, a coupling member, an actuating member, an engaging member, and a resilient member. The handle tube is adapted to extend movably relative to the frame tube. The coupling member is disposed on the handle tube. The actuating member is disposed movably on the handle tube, and is coupled to the coupling member for driving movement of the coupling member. The engaging member is connected to the coupling member. The resilient member is coupled to the coupling member for biasing the coupling member to a first position, where the engaging member is adapted to engage a selected one of the positioning holes so as to arrest movement of the handle tube relative to the frame tube. The actuating member is operable to move the coupling member from the first position to a second position against biasing action of the resilient member, such that the engaging member is adapted to be removed from the selected one of the positioning holes so as to permit movement of the handle tube relative to the frame tube.

Preferably, one of the handle tube and the engaging member is formed with an elongated guiding hole having a first end proximate to the positioning holes, and a second end distal from the positioning holes. The handle further includes a pin that extends through the elongated guiding hole, that is coupled to the other one of the handle tube and the engaging member, and that is biased toward one of the first and second ends of the elongated guiding hole due to biasing action of the resilient member on the coupling member.

Preferably, the coupling member is pivoted to the handle tube, and is pivotable between the first and second positions.

Preferably, the engaging member is pivoted to the coupling member.

Preferably, the handle tube includes a tube portion that is adapted to extend movably relative to the frame tube, and a housing portion that is connected to the tube portion. The coupling member is disposed on the housing portion.

According to yet another aspect of the present invention, there is provided a stroller that includes a frame tube, a handle tube, and a handle height adjusting mechanism. The frame tube has a plurality of positioning holes. The handle tube extends movably relative to the frame tube. The handle height adjusting mechanism includes a coupling member, an engaging member, and a resilient member. The coupling member is disposed on the handle tube. The engaging member is connected to the coupling member. The resilient member is coupled to the coupling member for biasing the coupling member to a first position, such that the engaging member engages a selected one of the positioning holes so as to arrest movement of the handle tube relative to the frame tube. The actuating member is operable to move the coupling member from the first position to a second position against biasing action of the resilient member, such that the engaging member is removed from the selected one of the positioning holes so as to permit movement of the handle tube relative to the frame tube.

Preferably, the handle height adjusting mechanism further includes an actuating member that is disposed movably on the handle tube, and that is coupled to the coupling member for driving movement of the coupling member between the first and second positions.

Preferably, the coupling member is pivoted to the handle tube, and is pivotable between the first and second positions.

Preferably, the coupling member is connected slidably to the handle tube, and is slidable between the first and second positions.

Preferably, the handle tube includes a tube portion that extends movably into the frame tube, and a housing portion that is connected to the tube portion. The coupling member is disposed on the housing portion.

The advantages and effects of the handle height adjusting mechanism of the present invention lie in the following. Through engagement between the engaging member and the selected one of the positioning holes in the frame tube, the handle tube can be locked at a selected height relative to the frame tube. The control element, which is disposed at a distance away from the coupling member, and which is connected to the coupling member via the connecting cable, may be operated to change the coupling member between the first and second positions so as to remove the engaging member from the selected one of the positioning holes. In addition, engagement between the engaging member and the selected one of the positioning holes is maintained by virtue of the biasing action of the resilient member when no user applied forces are present. Therefore, the handle height adjusting mechanism of the present invention has a simpler structure as compared to the prior art, is easier and requires less effort to operate, and facilitates control by the user at a distance so as to adjust the height of the handle.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
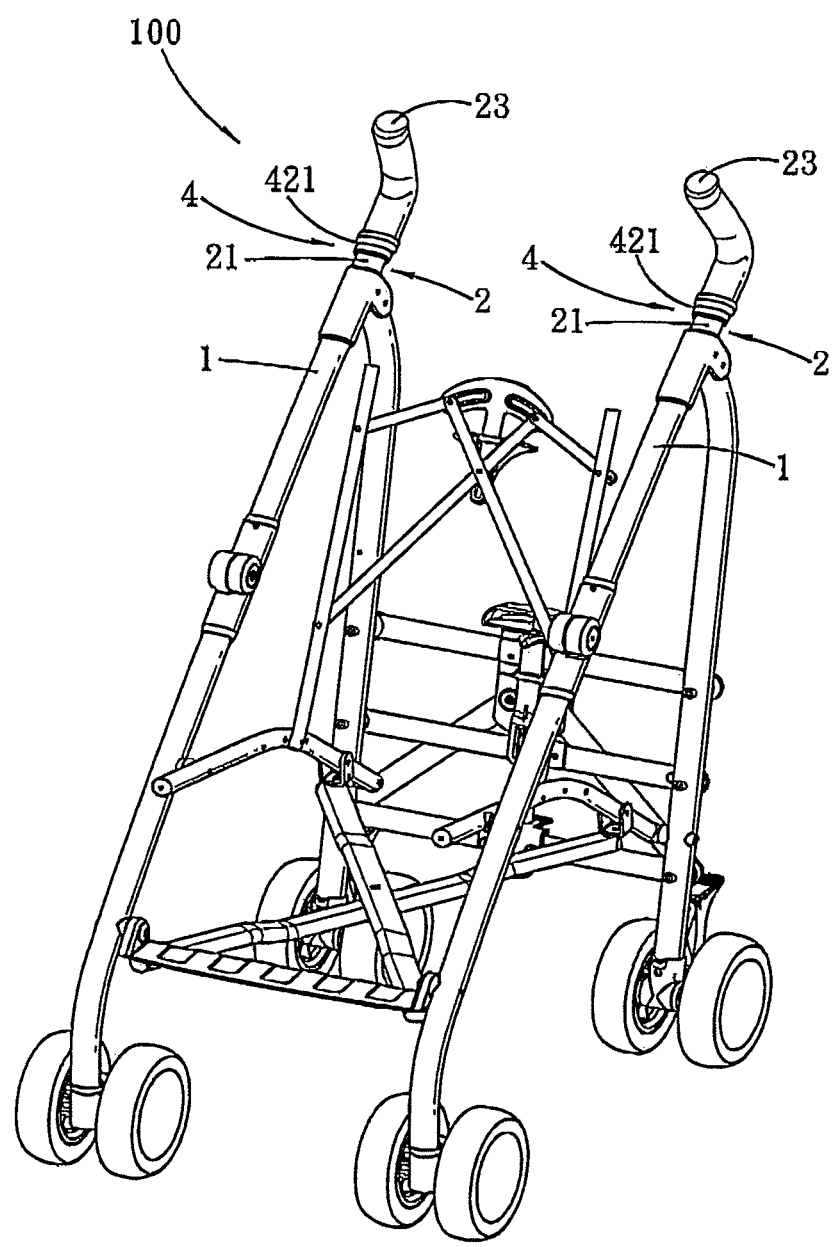
FIG. 1 is a perspective view, illustrating a stroller according to the first preferred embodiment of the present invention.

Before the present invention is described in greater detail, it should be noted that like elements are denoted by the same reference numerals throughout the disclosure.

Figure 2:
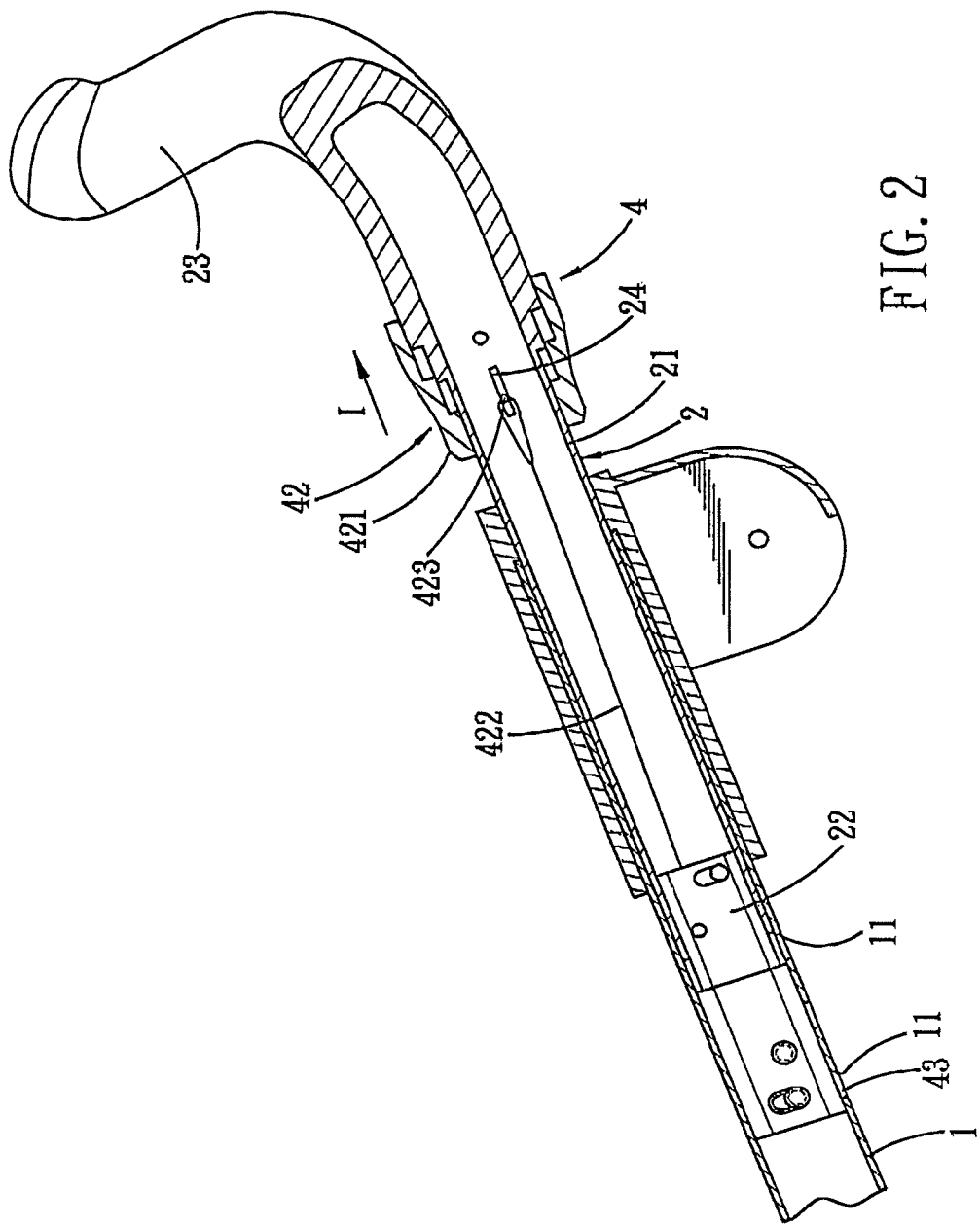
FIG. 2 is a fragmentary sectional view, illustrating a handle height adjusting mechanism disposed in a handle tube according to the first preferred embodiment.

Shown in FIG. 1 and FIG. 2 is a stroller 100 incorporating a handle height adjusting mechanism 4 according to the first preferred embodiment of the present invention. The stroller 100 includes two frame tubes 1 that are parallel to each other, two handle tubes 2, and two of the handle height adjusting mechanisms 4. Each of the handle tubes 2 includes a tube portion 21 that extends movably into an upper segment of a corresponding one of the frame tubes 1, a housing portion 22 that is connected to a lower part of the tube portion 21, and a handle portion 23 that is connected to an upper part of the tube portion 21 for holding by a user. Each of the handle height adjusting mechanisms 4 is disposed in a corresponding one of the handle tubes 2 for facilitating adjustment of a height of the corresponding one of the handle tubes 2 relative to a corresponding one of the frame tubes 1, and to lock the corresponding one of the handle tubes 2 at a selected height/position relative to the corresponding one of the frame tubes 1. It should be noted herein that the handle height adjusting mechanism 4 of the present invention may also be applied to other types of carriages, and is not limited to the application on a stroller as disclosed herein.

For simplicity of illustration, it is assumed that the stroller 100 includes only one frame tube 1, one handle tube 2, and one handle height adjusting mechanism 4 in the following description.

Figure 3:
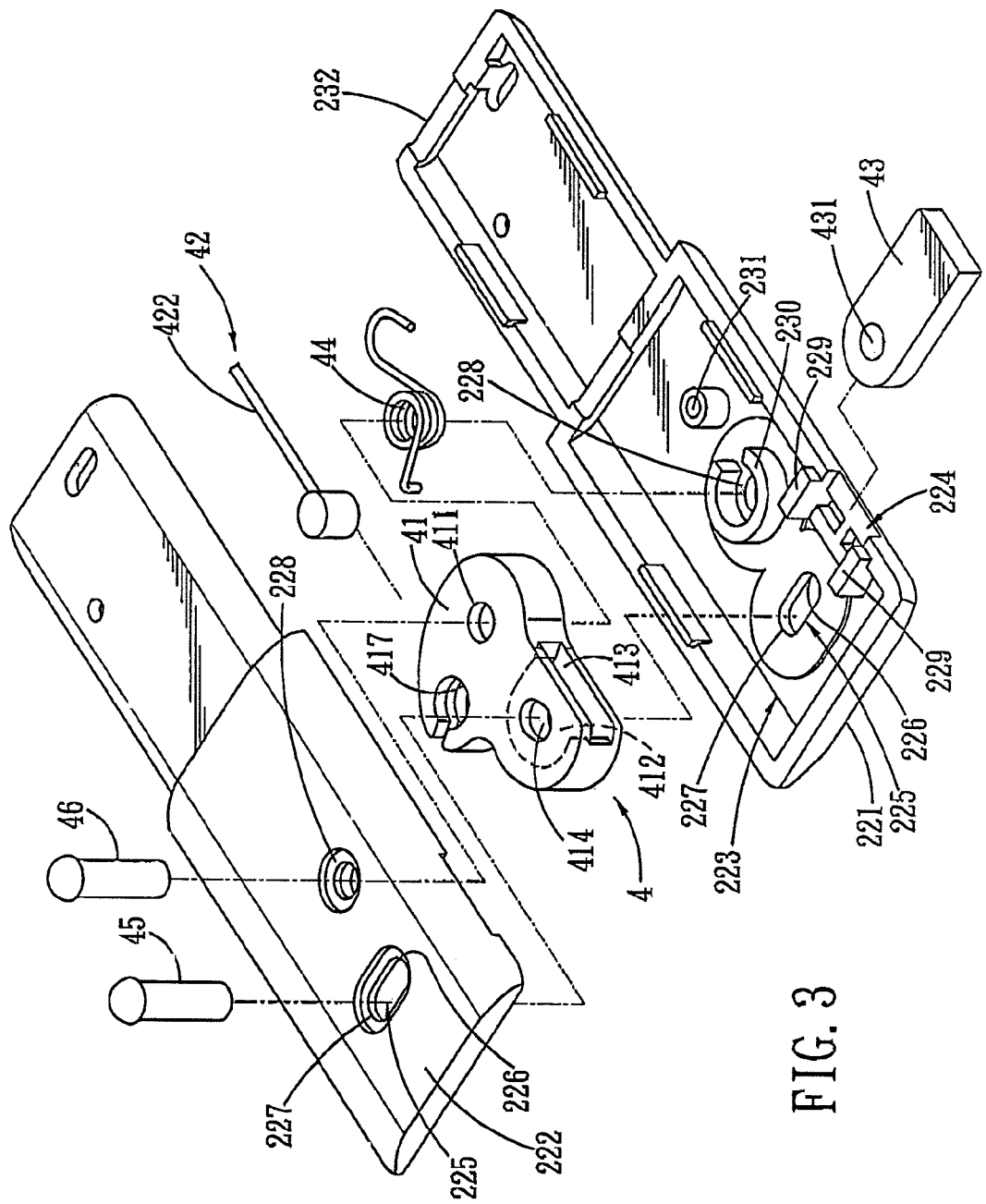
FIG. 3 is an exploded perspective view of the handle height adjusting mechanism according to the first preferred embodiment, illustrating assembly relationships among a coupling member, an actuating member, an engaging member, and a resilient member.
Figure 4:
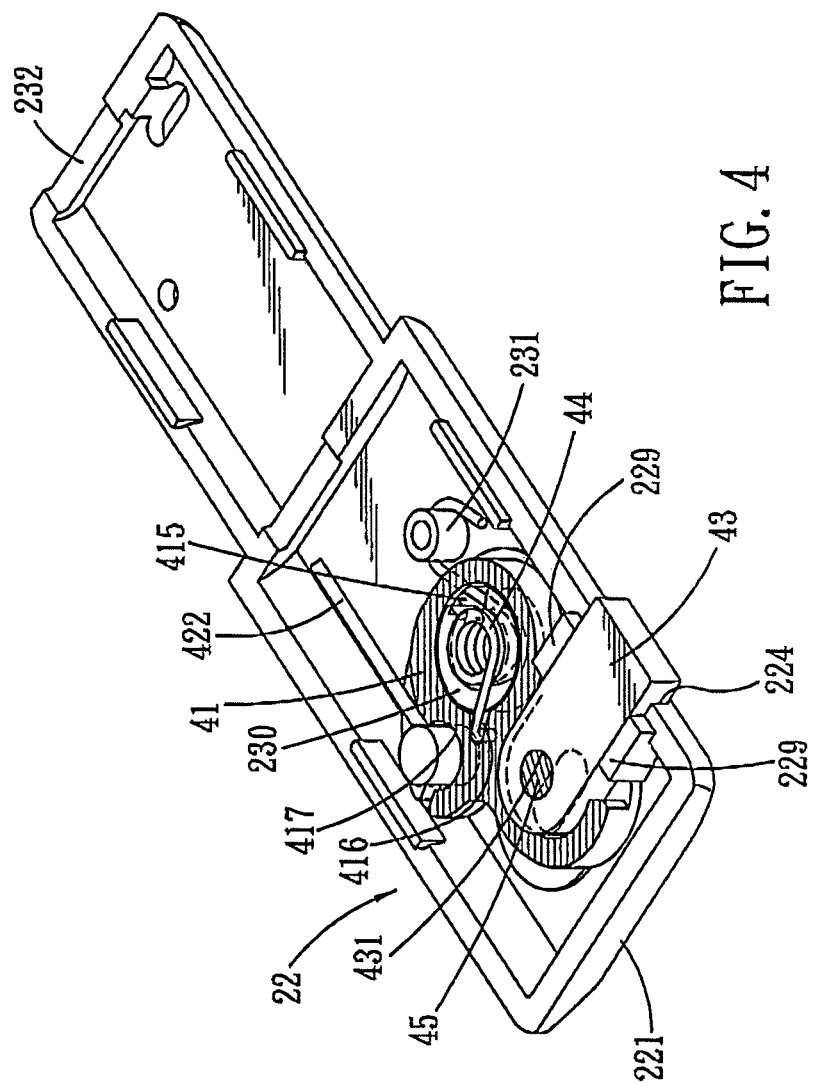
FIG. 4 is a fragmentary perspective view of the handle height adjusting mechanism according to the first preferred embodiment.

With reference to FIG. 2, FIG. 3 and FIG. 4, the frame tube 1 has a plurality of positioning holes 11 that are spaced apart from each other in an axial direction, and that are rectangular in shape. The housing portion 22 of the handle tube 2 is partially disposed in and partially exposed from the tube portion 21. The housing portion 22 includes a first outer housing 221, and a second outer housing 222 that is coupled to the first outer housing 221, and that cooperates with the first outer housing 221 to define an inner handle space 223. The housing portion 22 has an extension hole 224 in spatial communication with the inner housing space 223. The first and second outer housings 221, 222 correspond to each other in structure, and each of the first and second outer housings 221, 222 includes an elongated guiding hole 225 and a pivot hole 228. The elongated guiding hole 225 has a first end 226 proximate to the extension hole 224 and the positioning holes 11, and a second end 227 distal from the extension hole 224 and the positioning holes 11.

The handle height adjusting mechanism 4 includes a coupling member 41, an actuating member 42, an engaging member 43, and a resilient member 44. The coupling member 41 is disposed in the inner handle space 223. The actuating member 42 is disposed movably on the handle tube 2, and is coupled to the coupling member 41 for driving movement of the coupling member 41. The engaging member 43 is movable disposed in the inner handle space 223, is extendable through the extension hole 224 to engage a selected one of the positioning holes 11, and is driven by the coupling member 41. The resilient member 44 is coupled to the coupling member 41 for biasing the coupling member 41 to a first position, where the engaging member 43 engages the selected one of the positioning holes 11 so as to arrest movement of the handle tube 2 relative to the frame tube 1. The actuating member 42 is operable to move the coupling member 41 from the first position to a second position against biasing action of the resilient member 44, such that the engaging member 43 is removed from the selected one of the positioning holes 11 so as to permit movement of the handle tube 2 relative to the frame tube 1.

In this embodiment, the engaging member 43 is shaped as a plate, one end of which is extendable through the extension hole 224 for engagement with the selected one of the positioning holes 11, and the other end of which is formed with a through hole 431 for extension of a slide pin 45 therethrough. The coupling member 41 has a pivot hole 411 for extension of a pivot pin 46 therethrough, is formed with a first receiving space 412 with an opening 413 for permitting insertion of the engaging member 43 into the first receiving space 412, and two mounting holes 414 in spatial communication with the first receiving space 412 for extension of the slide pin 45 therethrough. The pivot pin 46 extends in sequence through the pivot hole 228 in one of the first and second outer housings 221, 222, the pivot hole 411 in the coupling member 41 and the pivot hole 228 in the other one of the first and second outer housings 221, 222 such that the coupling member 41 is pivoted to the housing portion 22, and is pivotable between the first and second positions. The slide pin 45 extends in sequence through the elongated guiding hole 225 in one of the first and second outer housings 221, 222, one of the mounting holes 414 in the coupling member 41, the through hole 431 in the engaging member 43, the other one of the mounting holes 414 in the coupling member 41, and the elongated guiding hole 225 in the other one of the first and second outer housings 221, 222 such that the engaging member 43 is slidable coupled to the housing portion 22 and is pivoted to the coupling member 41. The first outer housing 221 further includes two guiding parts 229 that are disposed proximate to the extension hole 224 and that respectively abut against opposite sides of the engaging member 43. As a result, when the coupling member 41 is pivoted between the first and second positions relative to the housing portion 22 about the pivot pin 46, the slide pin 45 is brought to move along the elongated guiding holes 225 between the first and second ends 226, 227 such that the engaging member 43 is movable between an engaging position (as shown in FIG. 5) and a disengaging position (as shown in FIG. 6) relative to the housing portion 22 within the confines as defined by the guiding parts 229.

The first outer housing 221 is further formed with a surrounding wall 230 that surrounds the pivot hole 228. In this embodiment, the resilient member 44 is a torsion spring (given the same reference numeral as the resilient member 44) having two ends that are respectively coupled to the handle tube 2 and the coupling member 41. Specifically, the torsion spring 44 is substantially received in a second receiving space 415 (see FIGS. 5 and 6) in the coupling member 41, is coupled to the pivot pin 46, and is restrained in position by the surrounding wall 230. In other words, the surrounding wall 230 prevents wobbling of the pivot pin 46 and the torsion spring 44. Moreover, one end of the torsion spring 44 is coupled to a protrusion 231 of the first outer housing 221, and the other end of the torsion spring 44 is received in a first engaging groove 416 (see FIG. 4) in the coupling member 41.

As best shown in FIG. 2, in this embodiment, the actuating member 42 includes a control element 421, a connecting cable 422, and a rivet 423. The control element 421 is mounted slidably to the handle tube 2. The rivet 423 extends into a groove 24 that extends along the axial direction in the handle tube 2. The connecting cable 422 is disposed within the handle space 223, is connected to the control element 421 by the rivet 423, and is coupled to the coupling member 41, such that the control element 421 is operable to slide along the handle tube 2 so as to bring the connecting cable 422 to move relative to the housing portion 22 to thereby change the coupling member 41 between the first and second positions. The connecting cable 422 is a steel cable, one end of which is connected to the rivet 423, and the other end of which extends through an opening 232 (see FIG. 3) in the housing portion 22 and is received in a second engaging groove 417 in the coupling member 41. Consequently, when the control member 421 slides along the handle tube 2, the rivet 423 is brought to slide in the groove 24, such that the connecting cable 422 is pulled by the rivet 423 to bring the coupling member 41 to pivot about the pivot pin 46.

Figure 5:
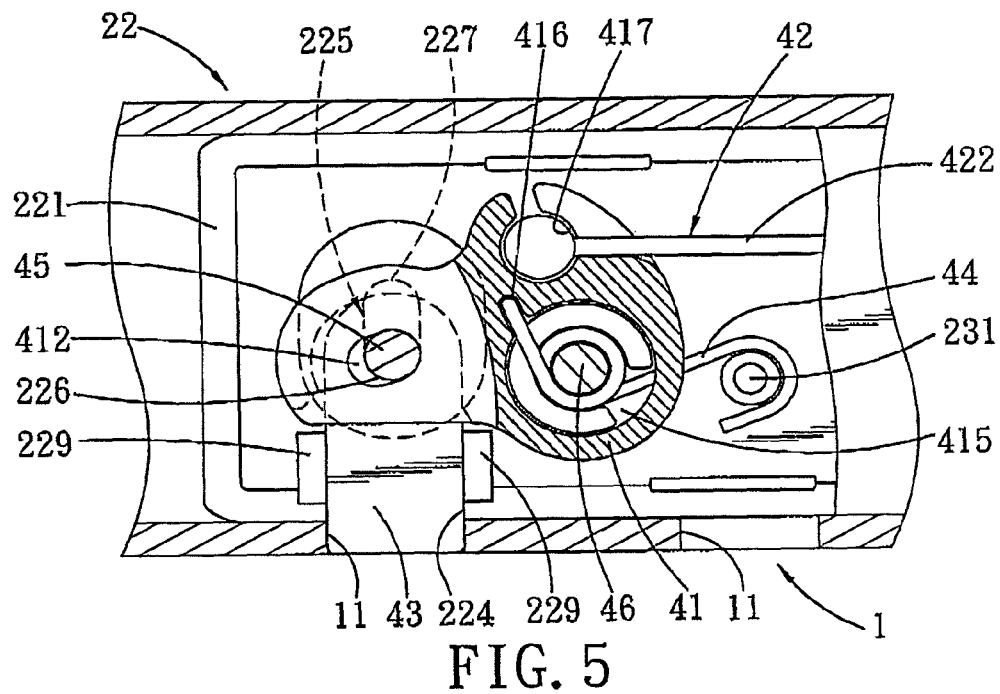
FIG. 5 is a fragmentary partly sectional view, illustrating the coupling member of the handle height adjusting mechanism of the first preferred embodiment at a first position, where the engaging member engages a selected positioning hole, and the handle tube is arrested from moving relative to the frame tube.
Figure 6:
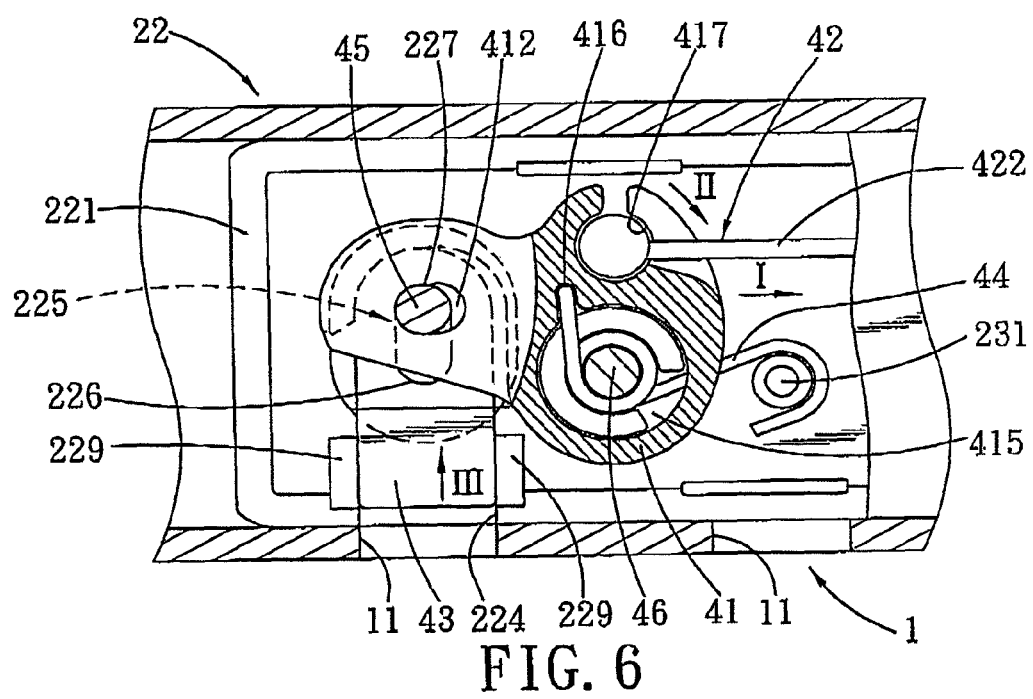
FIG. 6 is a fragmentary partly sectional view, illustrating the coupling member of the first preferred embodiment at a second position, where the engaging member is removed from the selected positioning hole, and movement of the handle tube relative to the frame tube is permitted.

With reference to FIG. 2, FIG. 4 and FIG. 5, due to the biasing action of the resilient member 44 on the coupling member 41, the slide pin 45 is biased toward one of the first and second ends 226, 227 of the elongated guiding hole 225. In this embodiment, the slide pin 45 is biased toward the first end 226 of the elongated guiding hole 225, such that the rivet 423 is biased toward a lower end of the groove 24 (i.e., towards the lower left of FIG. 2). At this time, the engaging member 43 engages the selected one of the positioning holes 11 so as to arrest movement of the handle tube 2 relative to the frame tube 1 to thereby lock the handle tube 2 at a desired height/position relative to the frame tube 1.

With reference to FIG. 2 and FIG. 6, when it is desired to adjust the height of the handle tube 2 relative to the frame tube 1, the user needs to pull the control element 421 of the actuating member 42 in a direction shown by arrow (I) in FIG. 2 so as to move the connecting cable 422 in the same direction, which in turn moves the coupling member 41 to pivot from the first position to the second position about the pivot pin 46 in a direction shown by arrow (II) in FIG. 6. As the coupling member 41 pivots about the pivot pin 46 in the direction shown by arrow (II), the slide pin 45 slides in the elongated guiding groove 225 from the first end 226 toward the second end 227, and the engaging member 43 moves in a direction shown by arrow (III) in FIG. 6. When the slide pin 45 is disposed at the second end 227 of the elongated guiding groove 225, the engaging member 43 is disengaged from the selected one of the positioning holes 11, such that adjustment to the relative location of the handle tube 2 and the frame tube 1 is permitted. Once the user moves the handle tube 2 to a desired height/position relative to the frame tube 1, the user only has to release the control element 421 to allow the biasing action of the resilient member 44 to take effect in order for the engaging member 43 to move in a direction opposite to that shown by arrow (III) so as to engage one of the positioning holes 11 that corresponds to the desired height to thereby lock the handle tube 2 relative to the frame tube 1 at the desired height. Through the design of the control element 421 and the connecting cable 422, the user can conveniently adjust the relative positions of the handle tube 2 and the frame tube 1 at a distance from the engaging member 43. Moreover, when the handle tube 2 is moved to the lowest position relative to the frame tube 1, the size of the stroller 100 (as shown in FIG. 1) can be reduced to facilitate storage or packaging.

It should be noted herein that, in this embodiment, the pivoting connection between the coupling member 41 and the engaging member 43, and the design of the control element 421 and the connecting cable 422 of the actuating member 42 cooperate to permit the user to control engagement/disengagement between the engaging member 43 and the selected one of the positioning holes 11 by simply operating the control element 421 to pull the connecting cable 422 to in turn pivot the coupling member 41 about the pivot pin 46 so as to move the engaging member 43 between the engaging and disengaging positions. Moreover, since the frictional coefficients among the elements of the handle height adjusting mechanism 4 are small, it is easier and more effortless for the user to operate the handle height adjusting mechanism 4.

Figure 7:
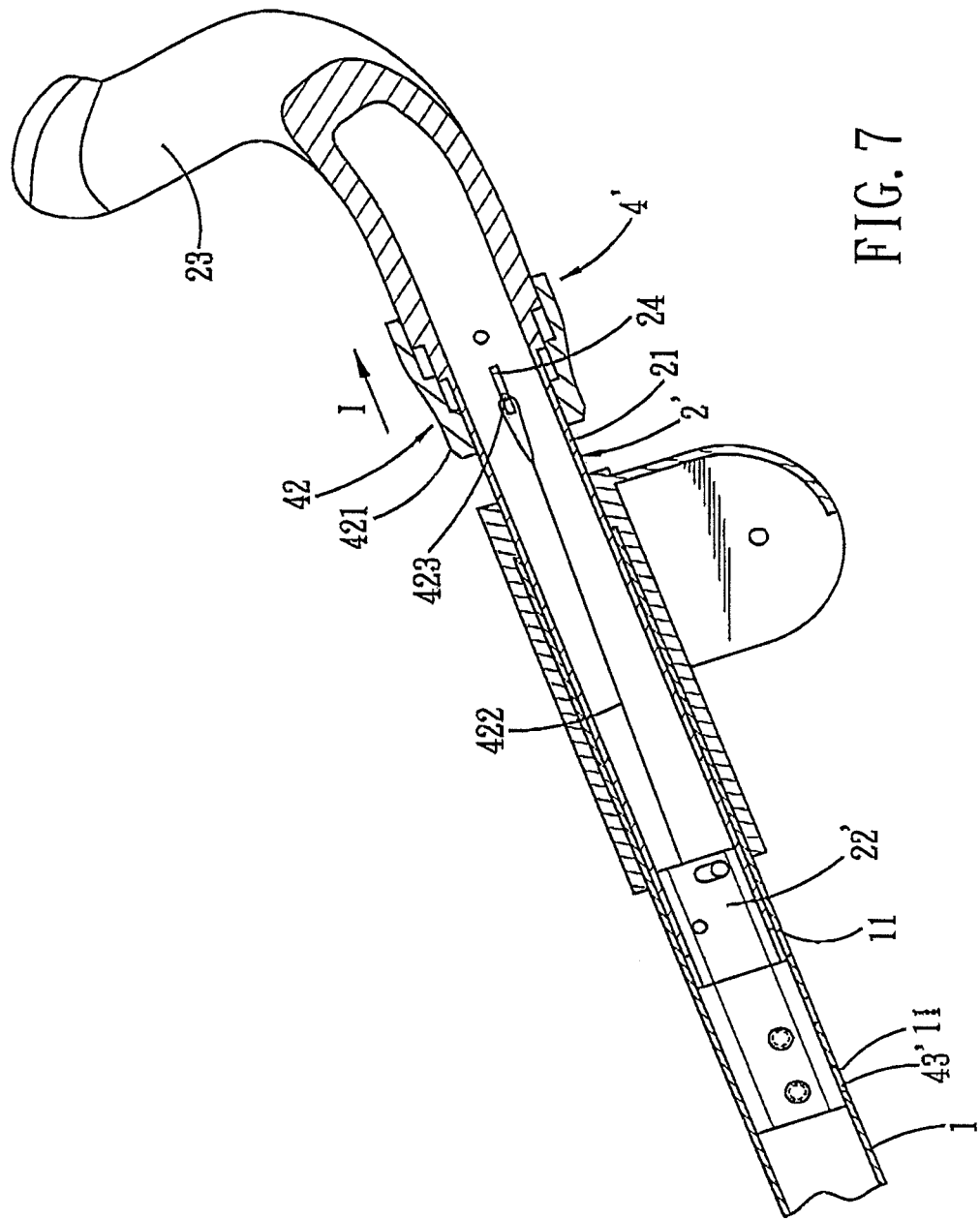
FIG. 7 is a fragmentary sectional view, illustrating the handle height adjusting mechanism disposed in the handle tube according to the second preferred embodiment of the present invention.
Figure 8:
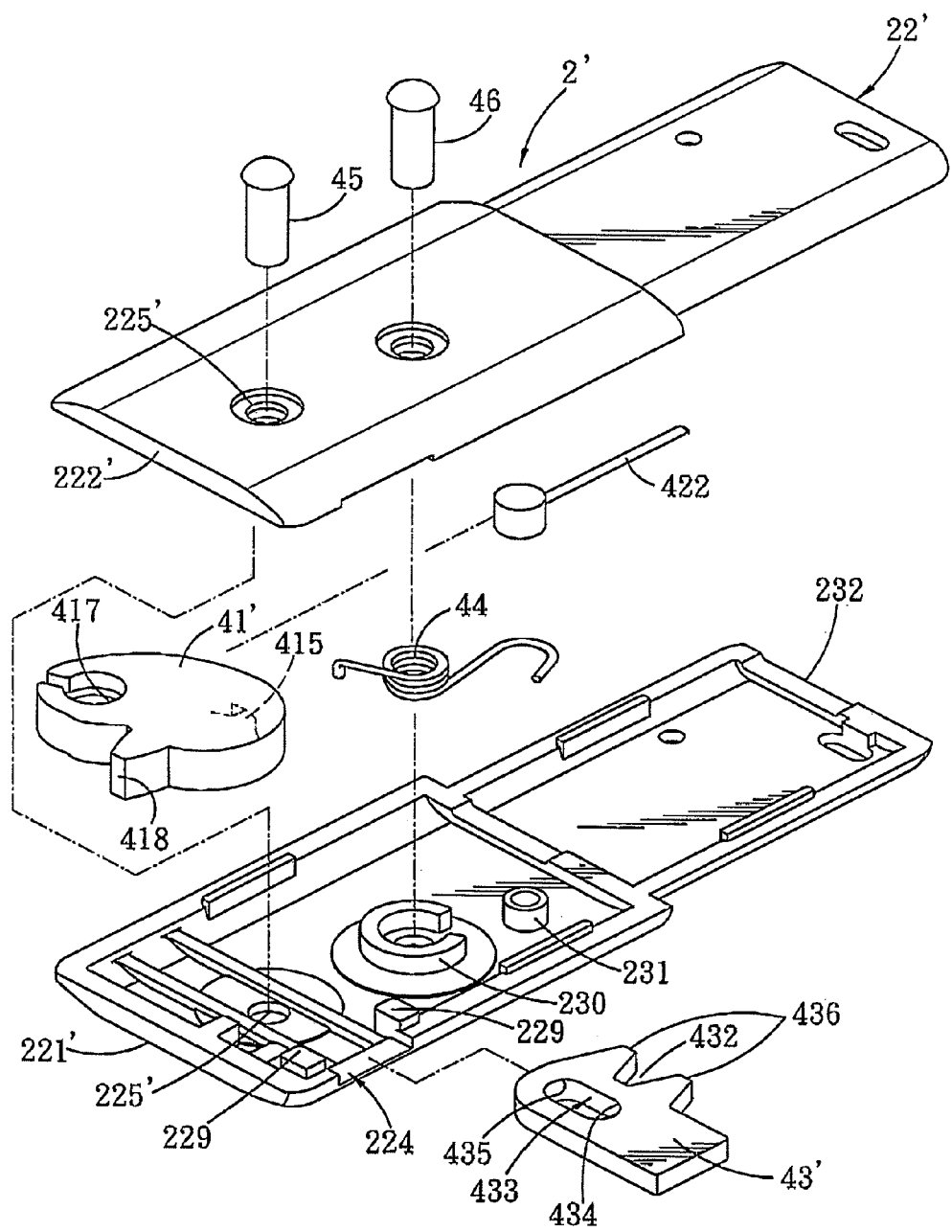
FIG. 8 is an exploded perspective view of the handle height adjusting mechanism according to the second preferred embodiment, illustrating assembly relationships among the coupling member, the actuating member, the engaging member and the resilient member.
Figure 9:
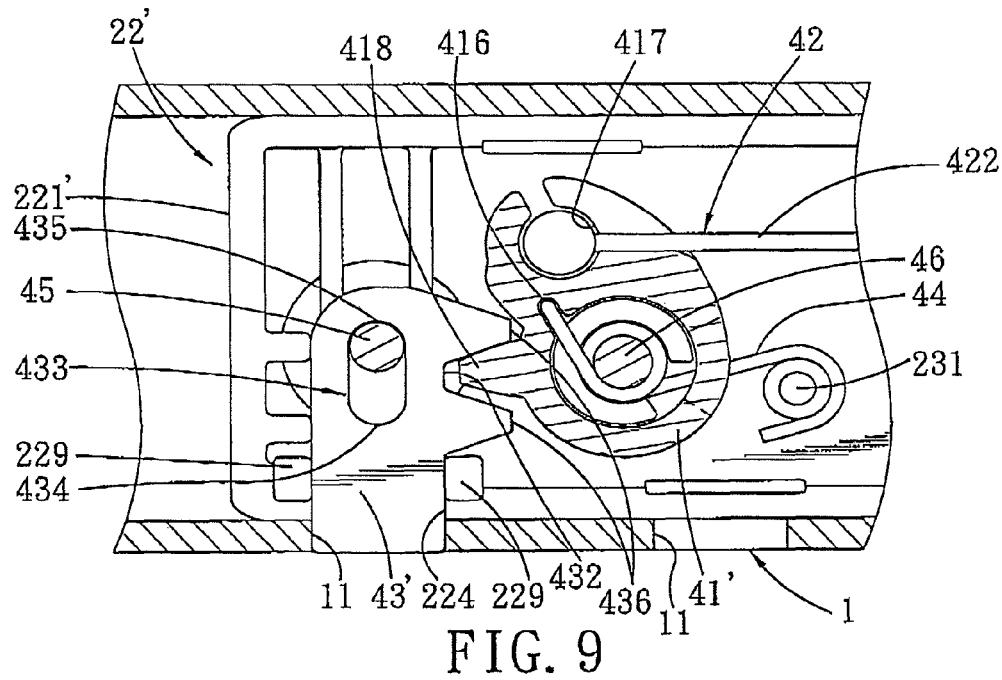
FIG. 9 is a fragmentary partly sectional view, illustrating the coupling member of the handle height adjusting mechanism of the second preferred embodiment at a first position, where the engaging member engages a selected positioning hole, and the handle tube is arrested from moving relative to the frame tube.

With reference to FIG. 7, FIG. 8 and FIG. 9, the handle height adjusting mechanism 4' according to the second preferred embodiment of the present invention is substantially similar to the handle height adjusting mechanism 4 of the first preferred embodiment. The differences between the first preferred embodiment and the second preferred embodiment basically lie in the designs of the housing portion 22', the coupling member 41' and the engaging member 43'.

The engaging member 43' is formed with a groove 432 defined by two teeth 436. The coupling member 41' has a protrusion 418 that is disposed movably in the groove 432. Instead of the elongated guiding hole 225, each of the first and second outer housings 221', 222' of the second preferred embodiment is formed with a round hole 225' for extension of the slide pin 45 therethrough. In addition, the engaging member 43' is formed with an elongated guiding hole 433 having a first end 434 proximate to the extension hole 224 and the positioning holes 11, and a second end 435 distal from the extension hole 224 and the positioning holes 11, and extending substantially perpendicular to the axial direction. The slide pin 45 extends in sequence through the round hole 225' in one of the first and second outer housings 221', 222', the elongated guiding hole 433 in the engaging member 43', and the round hole 225' in the other one of the first and second outer housings 221', 222' such that the engaging member 43' is slidable coupled to the housing portion 22'. The slide pin 45 is biased toward the second end 435 of the guiding hole 433 due to biasing action of the resilient member 44 on the coupling member 41'.

Figure 10:
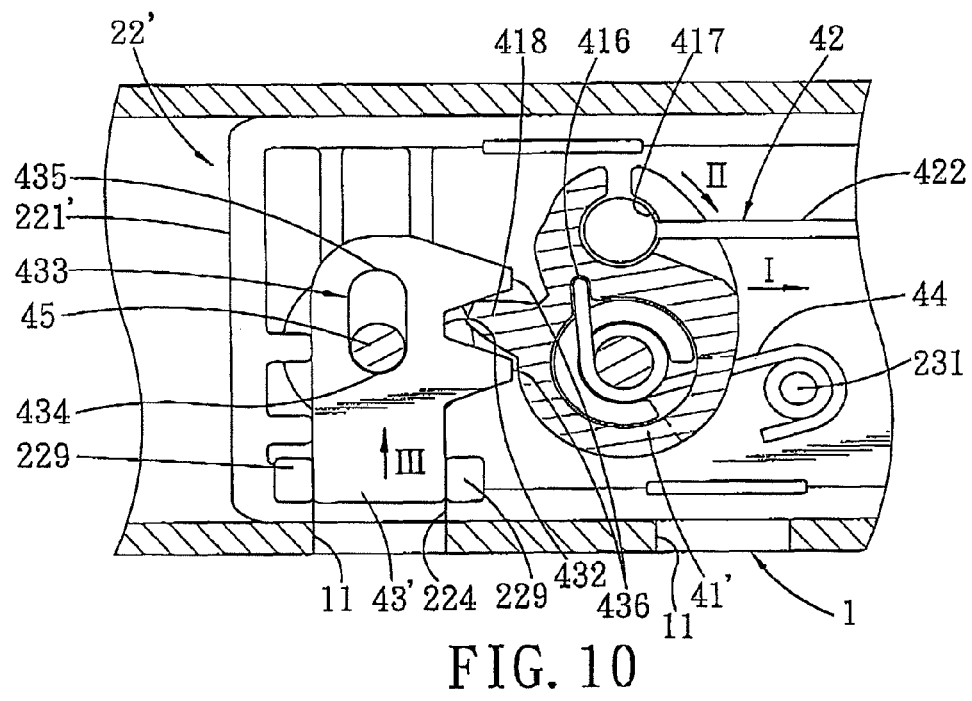
FIG. 10 is a fragmentary partly sectional view, illustrating the coupling member of the second preferred embodiment at a second position, where the engaging member is removed from the selected positioning hole, and movement of the handle tube relative to the frame tube is permitted.

With reference to FIG. 7 and FIG. 10, when it is desired to adjust the height of the handle tube 2' relative to the frame tube 1, the user needs to pull the control element 421 of the actuating member 42 in the direction shown by arrow (I) so as to move the connecting cable 422 in the same direction, which in turn moves the coupling member 41' to pivot from the first position to the second position about the pivot pin 46 in the direction shown by arrow (II). As the coupling member 41' pivots about the pivot pin 46 in the direction shown by arrow (II) against biasing action of the resilient member 44, the engaging member 43' is brought to move in the direction shown by arrow (III) in FIG. 10 due to the engagement between the protrusion 418 of the coupling member 41' and the groove 432 in the engaging member 43' (i.e., due to the protrusion 418 moving an upper one of the teeth 436) such that the slide pin 45 switches from abutting against the second end 435 of the elongated guiding hole 433 (as shown in FIG. 9) to abutting against the first end 434 of the elongated guiding hole 433 (as shown in FIG. 10), and such that the engaging member 43' is moved from the engaging position (as shown in FIG. 9) toward the disengaging position (as shown in FIG. 10) relative to the housing portion 22' within the confines defined by the guiding parts 229. When the engaging member 43' is disposed at the disengaging position, adjustment to the relative locations of the handle tube 2' and the frame tube 1 is permitted. Once the user moves the handle tube 2' to a desired height relative to the frame tube 1, upon release of the control element 421, the biasing action of the resilient member 44 moves the coupling member 41' to pivot in a direction opposite to that shown by arrow (II), such that the protrusion 418 of the coupling member 41' coupled movably to the groove 432 of the engaging member 43' pushes a lower one of the teeth 436, such that the engaging member 43' moves in a direction opposite to that shown by arrow (III) in FIG. 10 to engage one of the positioning holes 11 that corresponds to the desired height so as to lock the handle tube 2' at the desired height.

Figure 11:
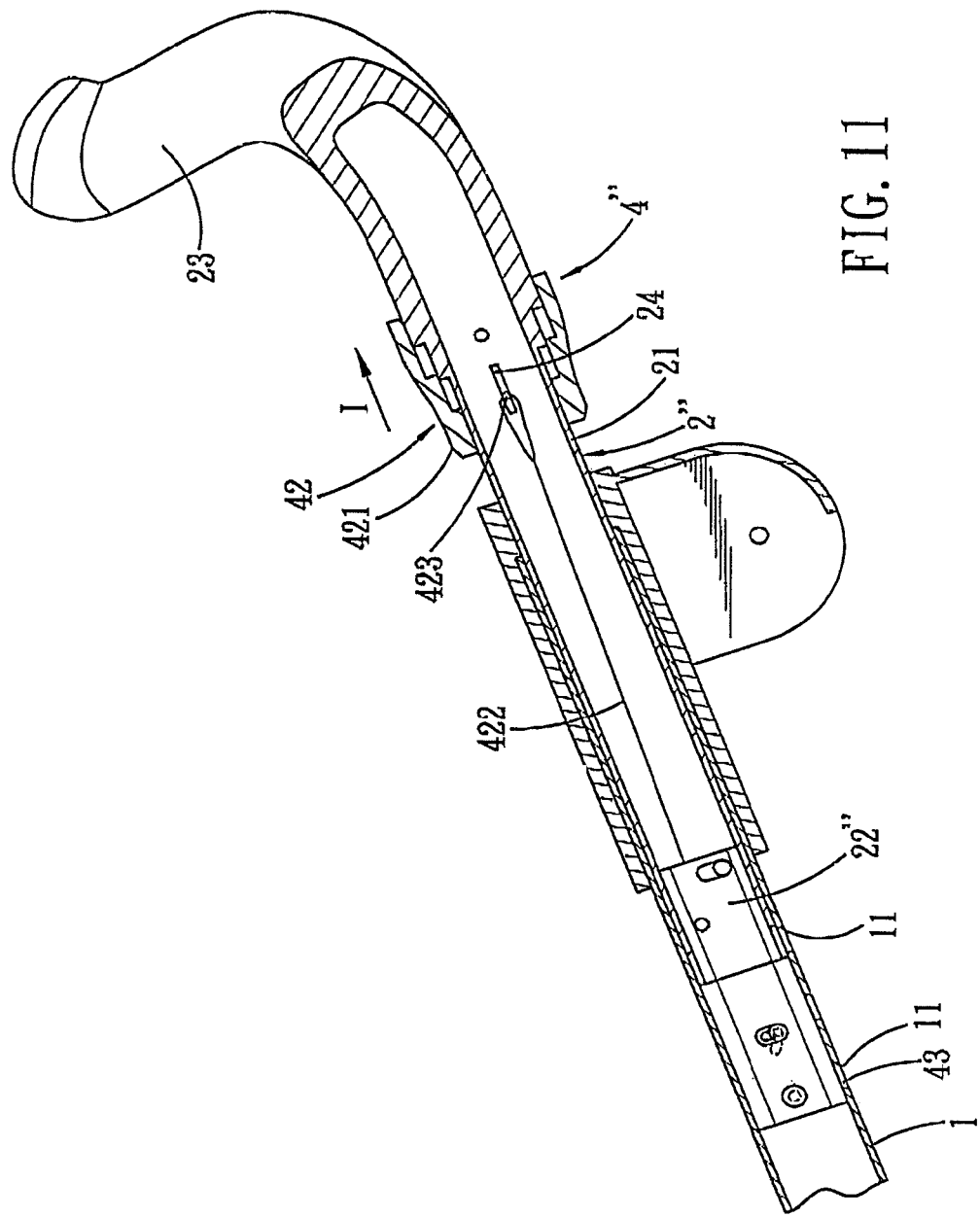
FIG. 11 is a fragmentary sectional view, illustrating the handle height adjusting mechanism disposed in the handle tube according to the third preferred embodiment of the present invention.
Figure 12:
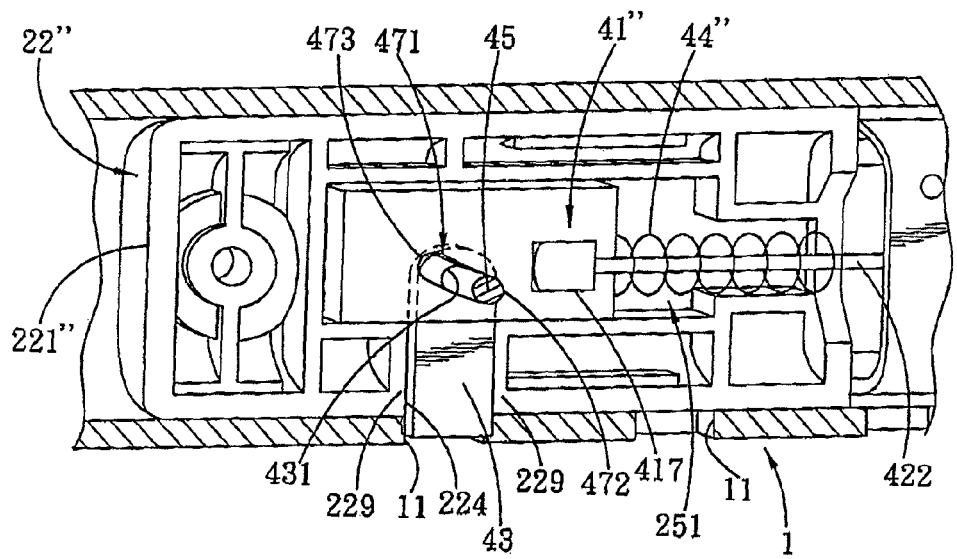
FIG. 12 is a fragmentary partly sectional view, illustrating the coupling member of the handle height adjusting mechanism of the third preferred embodiment at a first position, where the engaging member engages a selected positioning hole, and the handle tube is arrested from moving relative to the frame tube.
Figure 13:
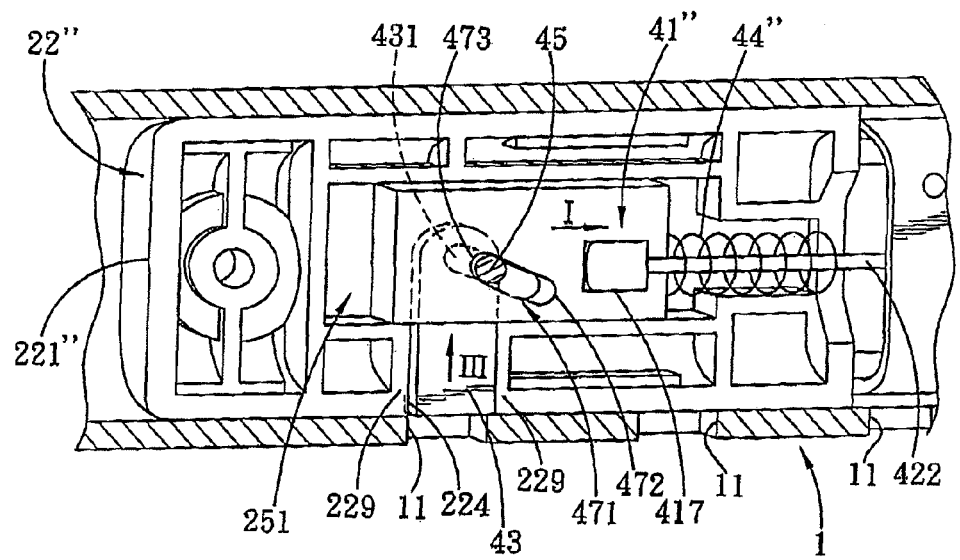
FIG. 13 is a fragmentary partly sectional view, illustrating the coupling member of the third preferred embodiment at a second position, where the engaging member is removed from the selected positioning hole, and movement of the handle tube relative to the frame tube is permitted.

With reference to FIG. 11, FIG. 12 and FIG. 13, the handle height adjusting mechanism 4" according to the third preferred embodiment of the present invention is substantially similar to the handle height adjusting mechanism 4 of the first preferred embodiment. The differences between the first preferred embodiment and the third preferred embodiment mainly lie in the designs of the housing portion 22", the coupling member 41", and the resilient member 44".

Figure 14:
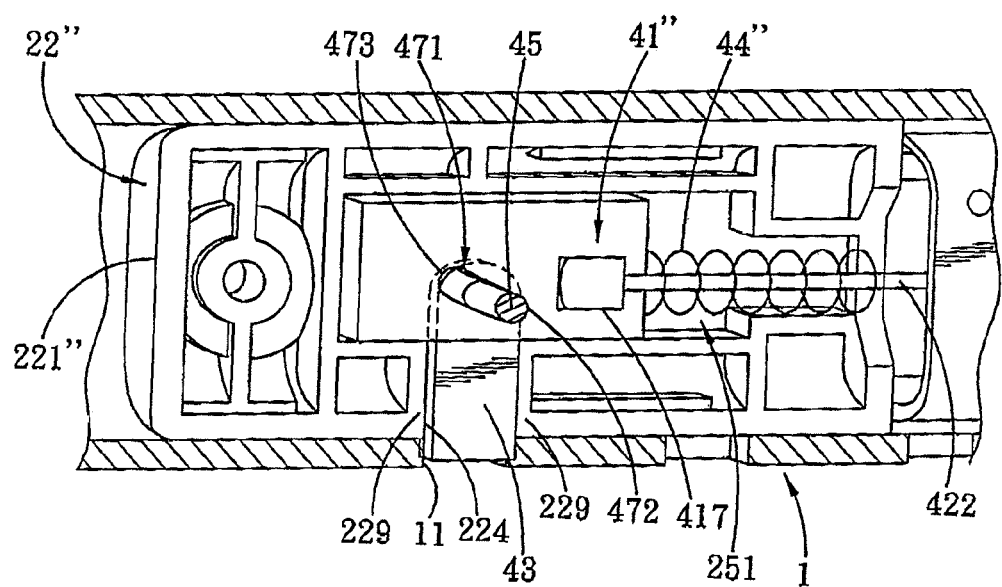
FIG. 14 is a fragmentary partly sectional view, illustrating a pin being formed integrally with the coupling member according to the third preferred embodiment.

According to the third preferred embodiment, the first outer housing 221" of the housing portion 22" is formed with a rectangular groove 251. The coupling member 41" is rectangular in shape, is connected slidably to the handle tube 2", and is slidable between the first and second positions within the rectangular groove 251. The coupling member 41" is formed with an elongated guiding hole 471 that is disposed to be inclined relative to the axial direction. The elongated guiding hole 471 has a first end 472 proximate to the extension hole 224, and a second end 473 distal from the extension hole 224. The slide pin 45 extends through the elongated guiding hole 471 in the coupling member 41" and the through hole 431 in the engaging member 43 so as to be coupled to the engaging member 43. The resilient member 44" is a compression spring (given the same reference numeral as the resilient member 44") in this embodiment, and has two ends respectively abutting against the handle tube 2" and the coupling member 41". The slide pin 45 is biased toward the first end 472 of the elongated guiding hole 471 due to biasing action of the compression spring 44" on the coupling member 41". At this time, the engaging member 43 engages the selected one of the positioning holes 11 so as to arrest movement of the handle tube 2" relative to the frame tube 1 to thereby lock the handle tube 2" at a desired height/position relative to the frame tube 1. It should be noted herein that, in practice, the slide pin 45 may be integrally formed on the engaging member 43 as illustrated in FIG. 14.

When it is desired to adjust the height of the handle tube 2" relative to the frame tube 1, the user needs to pull the control element 421 of the actuating member 42 in the direction shown by arrow (I) so as to move the connecting cable 422 in the same direction, which in turn moves the coupling member 41" from the first position toward the second position to slide in the rectangular groove 251 in the same direction against biasing action of the compression spring 44". As the coupling member 41" slides in the direction shown by arrow (I), the slide pin 45 is forced to slide in the elongated guiding groove 471 from the first end 472 toward the second end 473 so as to move the engaging member 43 in the direction shown by arrow (III). When the slide pin 45 is disposed at the second end 473 of the elongated guiding groove 471, the engaging member 43 is disengaged from the selected one of the positioning holes 11 (as shown in FIG. 13), such that adjustment to the relative locations of the handle tube 2" and the frame tube 1 is permitted. Once the user moves the handle tube 2" to a desired height relative to the frame tube 1, the user only has to release the control element 421 to allow the biasing action of the compression spring 44" to move the coupling member 41" in the direction opposite to that shown by arrow (I), which in turn forces the slide pin 45 to slide from the second end 473 of the elongated guiding groove 471 toward the first end 472 and brings the engaging member 43 back into engagement with a corresponding one of the positioning holes 11 (as shown in FIG. 12).

In this embodiment, through coupling the coupling member 41" and the engaging member 43 via the design of the slide pin 45 and the elongated guiding hole 471, and through the design of the control element 421 and the connecting cable 422 of the actuating member 42, the user is able to control engagement/disengagement between the engaging member 43 and the selected one of the positioning holes 11 by simply controlling the control element 421 to pull the connecting cable 422 to in turn cause the coupling member 41" to slide in the rectangular groove 251 so as to move the engaging member 43 between engaging and disengaging positions. Since the frictional coefficients among the elements of the handle height adjusting mechanism 4" are small, it is easier (or more effortless) for the user to operate the handle height adjusting mechanism 4".

To sum up, the handle height adjusting mechanism 4, 4', 4" of the present invention utilizes the engaging member 43 to extend through the extension hole 224 in the housing portion 22, 22', 22" and engage a selected one of the positioning holes 11 in the frame tube 1 such that the handle tube 2, 2', 2" is fixed at a corresponding selected height/position relative to the frame tube 1.

Through operating the control element 421 of the actuating member 42, the coupling member 41, 41', 41" is moved to in turn remove the engaging member 43 from engagement with the selected one of the positioning holes 11. In addition, with the biasing action of the resilient member 44, 44", the engaging member 43 is forced to move back into engagement with the selected one of the positioning holes 11 due to coupling between the coupling member 41, 41', 41" and the engaging member 43 when no user applied forces are present. As such, the height of the handle tube 2, 2', 2" relative to the frame tube 1 can be easily and effortlessly adjusted.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A handle height adjusting mechanism for a stroller including a frame tube that has a plurality of positioning holes, and a handle tube that extends movably relative to the frame tube, said handle height adjusting mechanism comprising:
   a coupling member adapted to be disposed on the handle tube;
   an actuating member adapted to be disposed movably on the handle tube, and coupled to said coupling member for driving movement of said coupling member;
   an engaging member connected to said coupling member; and
   a resilient member coupled to said coupling member for biasing said coupling member to a first position, where said engaging member is adapted to engage a selected one of the positioning holes so as to arrest movement of the handle tube relative to the frame tube;
   wherein said actuating member is operable to move said coupling member from the first position to a second position against biasing action of said resilient member such that said engaging member is adapted to be removed from the selected one of the positioning holes so as to permit movement of the handle tube relative to the frame tube;
   wherein said coupling member is adapted to be pivoted to the handle tube, and is pivotable between the first and second positions.

2. The handle height adjusting mechanism as claimed in claim 1, wherein said resilient member is a torsion spring having two ends that are respectively adapted to be coupled to the handle tube and said coupling member.

3. The handle height adjusting mechanism as claimed in claim 1, wherein said engaging member is pivoted to said coupling member.

4. The handle height adjusting mechanism as claimed in claim 1, wherein said engaging member is formed with a groove defined by two teeth, and said coupling member has a protrusion that is disposed movably in said groove.

5. A handle height adjusting mechanism for a stroller including a frame tube that has a plurality of positioning holes, and a handle tube that extends movably relative to the frame tube, said handle height adjusting mechanism comprising:
  a coupling member adapted to be disposed on the handle tube;
  an actuating member adapted to be disposed movably on the handle tube, and coupled to said coupling member for driving movement of said coupling member;
  an engaging member connected to said coupling member; and
  a resilient member coupled to said coupling member for biasing said coupling member to a first position, where said engaging member is adapted to engage a selected one of the positioning holes so as to arrest movement of the handle tube relative to the frame tube;
  wherein said actuating member is operable to move said coupling member from the first position to a second position against biasing action of said resilient member, such that said engaging member is adapted to be removed from the selected one of the positioning holes so as to permit movement of the handle tube relative to the frame tube;
  wherein said actuating member includes a control element adapted to be mounted slidably to the handle tube, and a connecting cable adapted to be disposed within the handle tube and connected between said coupling member and said control element, such that said control element is operable to slide along the handle tube so as to drive said coupling member to move.

6. The handle height adjusting mechanism as claimed in claim 1,
  wherein said engaging member is formed with an elongated guiding hole having a first end proximate to the positioning holes, and a second end distal from the positioning holes, said handle height adjusting mechanism further comprising a pin that extends through said elongated guiding hole, that is adapted to be coupled to the handle tube, and that is biased toward said second end of said elongated guiding hole due to biasing action of said resilient member on said coupling member.

7. The handle height adjusting mechanism as claimed in claim 6, wherein said elongated guiding hole is disposed to extend substantially perpendicular to the axial direction.

8. A handle height adjusting mechanism for a stroller including a frame tube that has a plurality of holes, and a handle tube that extends movably relative to the frame tube, said handle height adjusting mechanism comprising:
  a coupling member adapted to he disposed on the handle tube;
  an actuating member adapted to be disposed movably on the handle tube, and coupled to said coupling member for driving movement of said coupling member;
  an engaging member connected to said coupling member; and
  a resilient member coupled to said coupling member for biasing said coupling member to a first position, where said engaging member is adapted to engage a selected one of the positioning holes so as to arrest movement of the handle tube relative to the frame tube;
  wherein said actuating member is operable to move said coupling member from the first position to a second position against biasing action of said resilient member, such that said engaging member is adapted to be removed from the selected one of the positioning holes so as to permit movement of the handle tube relative to the frame tube;
  wherein said coupling member is adapted to be connected slidably to the handle tube, and is slidable between the first and second positions in a direction parallel to said handle tube.

9. The handle height adjusting mechanism as claimed in claim 8, wherein said coupling member is formed with an elongated guiding hole that is disposed to be inclined relative to the axial direction, said handle height adjusting mechanism further comprising a pin that extends through said elongated guiding hole, and that is coupled to said engaging member.

10. The handle height adjusting mechanism as claimed in claim 8, wherein said resilient member is a compression spring that has two ends adapted to abut respectively against the handle tube and said coupling member.

11. A handle for a stroller including a frame tube that has a plurality of positioning holes, said handle comprising:
  a handle tube adapted to extend movably relative to the frame tube;
  a coupling member disposed on said handle tube;
  an actuating member disposed movably on said handle tube, and coupled to said coupling member for driving movement of said coupling member;
  an engaging member connected to said coupling member; and
  a resilient member coupled to said coupling member for biasing said coupling member to a first position, where said engaging member is adapted to engage a selected one of the positioning holes so as to arrest movement of said handle tube relative to the frame tube;
  wherein said actuating member is operable to move said coupling member from the first position to a second position against biasing action of said resilient member, such that said engaging member is adapted to be removed from the selected one of the positioning holes so as to permit movement of said handle tube relative to the frame tube;
  wherein said coupling member is adapted to be connected slidably to the handle tube, and is slidable between the first and second positions in a direction parallel to said handle tube.

12. The handle as claimed in claim 11,
  wherein one of said handle tube and said engaging member is formed with an elongated guiding hole having a first end proximate to the positioning holes, and a second end distal from the positioning holes, said handle further comprising a pin that extends through said elongated guiding hole, that is coupled to the other one of said handle tube and said engaging member, and that is biased toward one of said first and second ends of said elongated guiding hole due to biasing action of said resilient member on said coupling member.

13. The handle as claimed in claim 12, wherein said coupling member is pivoted to the handle tube, and is pivotable between the first and second positions.

14. A handle for a stroller including a frame tube that has a plurality of positioning holes, said handle comprising:
  a handle tube adapted to extend movably relative to the frame tube;
  a coupling member disposed on said handle tube;
  an actuating member disposed movably on said handle tube and coupled to said coupling member for driving movement of said coupling member;
  an engaging member connected to said coupling member; and a resilient member coupled to said coupling member for biasing said coupling member to a first position, where said engaging member is adapted to engage a selected one of the positioning holes so as to arrest movement of said handle tube relative to the frame tube;

wherein said actuating member is operable to move said coupling member from the first position to a second position against biasing action of said resilient member, such that said engaging member is adapted to be removed from the selected one of the positioning holes so as to permit movement of said handle tube relative to the frame tube;

wherein said engaging member is pivoted to said coupling member.

15. The handle as claimed in claim 11, wherein said handle tube includes a tube portion that is adapted to extend movably relative to said frame tube, and a housing portion that is connected to said tube portion, said coupling member being disposed on said housing portion.

16. A stroller, comprising:
a frame tube that has a plurality of positioning holes;
a handle tube that extends movably relative to said frame tube; and
a handle height adjusting mechanism that includes
a coupling member disposed on said handle tube,
an engaging member connected to said coupling member, and
a resilient member coupled to said coupling member for biasing said coupling member to a first position, such that said engaging member engages a selected one of said positioning holes so as to arrest movement of said handle tube relative to said frame tube,
said coupling member being movable from the first position to a second position against biasing action of said resilient member, such that said engaging member is removed from the selected one of said positioning holes so as to permit movement of said handle tube relative to said frame tube;
wherein said handle tube includes a tube portion that extends movably into said frame tube, and a housing portion that is connected to said tube portion, said coupling member being disposed on said housing portion.

17. The stroller as claimed in claim 16, wherein said handle height adjusting mechanism further includes an actuating member that is disposed movably on said handle tube, and that is coupled to said coupling member for driving movement of said coupling member between the first and second positions.

18. The stroller as claimed in claim 16, wherein said coupling member is pivoted to said handle tube, and is pivotable between the first and second positions.

19. The stroller as claimed in claim 16, wherein said coupling member is connected slidably to said handle tube, and is slidable between the first and second positions.

20. A handle for a stroller including a frame tube that has a plurality of positioning holes, said handle comprising:
a handle tube adapted to extend movably relative to the frame tube;
a coupling member disposed on said handle tube;
an actuating member mounted slidably to said handle tube, and coupled to said coupling member for driving movement of said coupling member;
an engaging member connected to said coupling member; and
a resilient member coupled to said coupling member for biasing said coupling member to a first position, where said engaging member is adapted to engage a selected one of the positioning holes so as to arrest movement of said handle tube relative to the frame tube;
wherein said actuating member is operable to move said coupling member from the first position to a second position against biasing action of said resilient member, such that said engaging member is adapted to be removed from the selected one of the positioning holes so as to permit movement of said handle tube relative to the frame tube.

* * * * *